Patented Mar. 27, 1928.

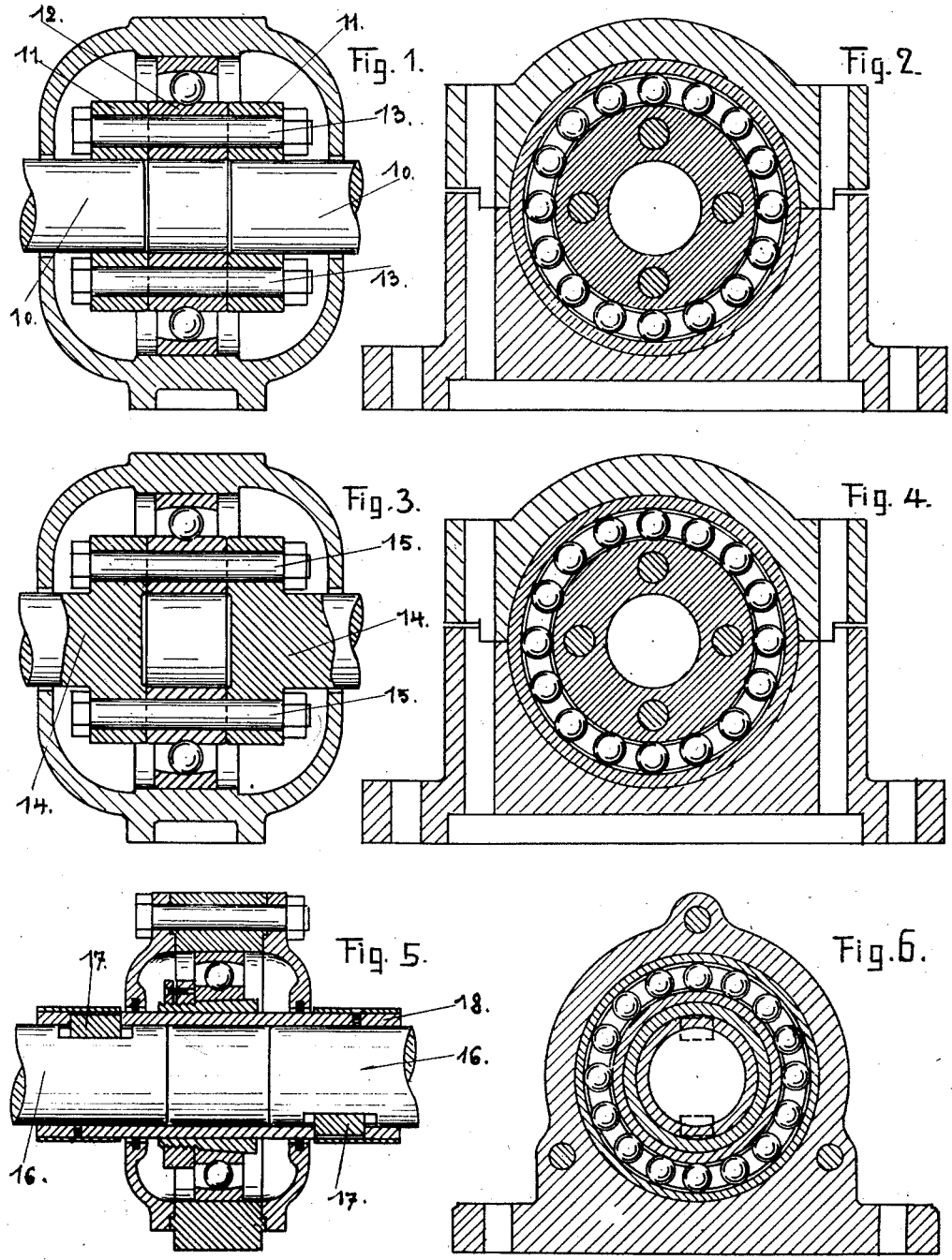

1,663,629

UNITED STATES PATENT OFFICE.

HANS FRITZSCHING, OF VIENNA, AUSTRIA.

ANTIFRICTION BEARING.

Application filed April 28, 1926. Serial No. 105,157.

The present invention relates to improvements in bearings for line-shafts, cranked shafts or similar applications and has for its object to facilitate mounting or dismounting of any type of anti-friction bearings without removal or disassembling of the said shaft-units, and to spare the couplings for the shafts to be supported. It is obvious that the length of the single shafts is equal to the distance of two subsequent shaft supports or to a multiple of this distance. Each bearing-unit is located between the ends of the two shafts to be supported, the clearance however for this location may be very small, and only wide enough as to permit the anti-friction bearing to be placed on its seat perpendicularly to the direction of the shafts.

The advantages of this new type of bearing become evident especially when replacing an old bearing in place of a new one. Replacement is effected in some few minutes which in most cases is alone a factor of highest importance. A further advantage of the bearing-unit which is the object of my invention is, that it fills also the function of a coupling medium and spares the employment of the ordinary shaft-couplings. With the new bearing-unit it is further possible to bear such units on anti-friction bearings, which for practical reasons, used till now on plain bearings, as for instance: long-line shafts, crank-shafts, etc.

The detailed construction of the complete anti-friction bearing unit will be each time adapted to the special application. In the accompanying drawings only three possible forms are shown. The Figures 1, 3 and 5 are sectional views, Figures 2, 4, 6, are the corresponding longitudinal sections. Similar reference characters indicate similar parts in the figures of the drawing.

Fig. 1 shows said anti-friction bearing unit, consisting of a ball bearing, the coupling means and the housing. The two shafts are connected with the bearing by a set of screw bolts engaging on the one hand the bolt holes, provided in the inner race of the ball bearing, and on the other hand the bolt holes provided in the flange rings. The flange rings 11 are secured on their shafts 10 by suitable means.

Fig. 3 shows a similar application where flanges are forged out of one piece with the shafts 14. The connection with the bearing is effected by a set of screw bolts 15, engaging in the one hand the bolt holes provided in the inner race 12 of the ball bearing, and on the other hand the bolt holes provided in the shaft ends.

Fig. 5 shows a ball bearing, combined with a cylindrical coupling sleeve. This sleeve 18 engages partly the cylindrical shaft ends 16 and it may be pushed entirely over the one or the other end, after removing the keys 17 which firmly connect the shafts 16 with the sleeve 18. Then it is possible to mount on or to withdraw the ball bearing from its support perpendicularly to the direction of the shafts.

I have illustrated only three possible forms of my invention but it is obvious, that changes may be made therein within the spirit and scope thereof as defined in the appended claim.

I claim:

Bearing-unit, consisting of an anti-friction bearing and a special housing, the bearing-unit being disposed between the two shafts to be supported and connected within a clearance so wide as to permit the bearing-unit to be inserted or to be taken from its support only by a movement perpendicular to the direction of said shafts and without any lateral or other movements of said shafts.

In testimony whereof I affix my signature.

HANS FRITZSCHING.